Dec. 11, 1962  W. H. BANFORD ETAL  3,068,245
FURFURAL RECOVERY PROCESS
Filed Dec. 24, 1958
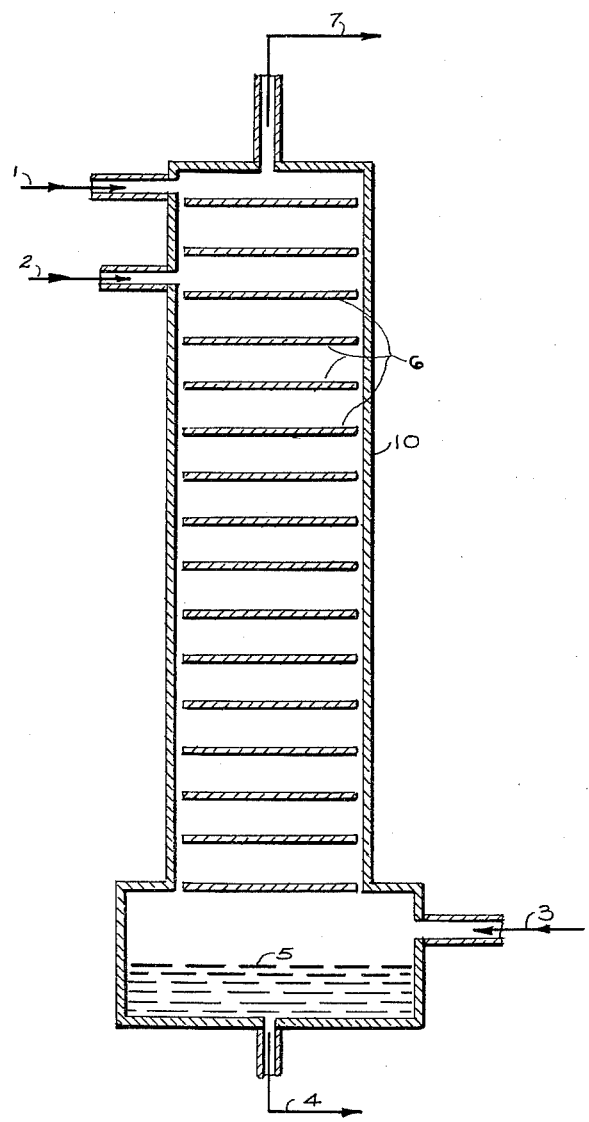
INVENTORS
William H. Banford
Gilbert M. Turner
BY
Amos D. Cole
AGENT

3,068,245
FURFURAL RECOVERY PROCESS
William H. Banford, Lewiston, and Gilbert M. Turner, Ransomville, N.Y., assignors to E. I. du Pont de Nemours and Company, Wilmington, Del., a corporation of Delaware
Filed Dec. 24, 1958, Ser. No. 782,754
5 Claims. (Cl. 260—347.9)

This invention relates to the vaporization and recovery of furfural in the form of gaseous mixtures of furfural vapor and steam.

Steam furfural compositions of this type are commonly employed in the production of furfural products. Such uses include the gas phase oxidation of furfural to furoic acid, the hydrogenation of furfural to tetrahydrofurfuryl alcohol and the decarbonylation of furfural to furan. Catalytic, gas-phase furfural decarbonylation processes as disclosed by Whitman, U.S. Patent 2,374,-149 (1945), and Tyran, U.S. Patent 2,776,691 (1957), are preferably carried out by passing a mixture of steam and furfural vapor over a chromite catalyst. In general, these processes make use of a steam-furfural mixture in which the mole ratio of steam-furfural is in the range 1:1 to 13:1 or higher. However, steam-furfural mole ratios of 5:1 to 10:1 are generally more desirable.

Steam-furfural vapor compositions may be prepared by mixing steam with furfural vapor or by distillation of a mixture of furfural and water. This mixture yields a low-boiling azeotrope which boils at 98° C. at atmospheric pressure and contains 35% by weight of furfural which corresponds to a steam-furfural mole ratio of 10:1.

Commercial furfural, although substantially pure, is usually dark in color due to the presence of small quantities of tar, furoic acid and other impurities which form on standing in the presence of air. These impurities, interfere with the quantitative recovery of furfural in the vapor phase in the usual distillation or steam distillation processes. They also catalyze additional chemical loss of product. Contamination of vaporization equipment with tar is a constant problem resulting in rapid clogging of equipment and occlusion of furfural. An efficient method of recovering furfural as a steam-furfural mixture with substantially no chemical loss and with a substantial decrease in shut-downs for tar removal is essential for the economical production of furfural products.

In the production of furan by the catalytic decarbonylation of furfural in the presence of steam, water containing small concentrations of unconverted furfural (about 0.1 to 5% by weight) and impurities including high boiling tars (about 0.5 to 2%) is obtained as a water effluent in the isolation of the furan produced. For the most economical prosecution of these processes, recovery of the unreacted furfural from this waste aqueous condenser effluent is essential.

It is an object of this invention to provide a continuous process for the substantially quantitative recovery of furfural in the form of a gaseous steam-furfural composition by vaporization of liquid furfural. It is a further object to accomplish this vaporization with substantially complete removal of tarry impurities from the vaporization equipment. It is a still further object to accomplish the aforesaid vaporization of liquid furfural with simultaneous recovery of furfural from a dilute aqueous solution thereof. It is an additional object to obtain a gaseous steam-furfural mixture in which the mole ratio of steam to furfural is less than the azeotrope ratio of about 10:1. Another object is to produce a steam-furfural composition suitable for direct use in the catalytic decarbonylation of furfural to furan in the presence of steam by vaporizing furfural and simultaneously recovering unconverted furfural in the dilute aqueous solution obtained in the isolation of furan from the crude off-gas produced in the said catalytic decarbonylation. Other objects of the invention will become apparent in the following discussion.

The above mentioned objects are achieved by passing liquid furfural into the top part of a distilling column and water or a dilute solution of furfural in water into a lower part of the said column while passing steam into the bottom part of the column above the liquid level of the bottom product. The bottom product, which consists of an aqueous phase substantially free of furfural but containing suspended tars and other non-volatile impurities, is then removed from the bottom of the column and an overhead gaseous product consisting of furfural and steam is removed from the top of the column. All these steps are carried out in a continuous fashion.

When the total furfural feed and the steam feed are adjusted with due allowance for condensation of water as determined by the heat balance so that the mole ratio of uncondensed steam to furfural is less than the ratio of steam to furfural in the azeotrope composition, viz. about 10:1, the overhead product will be found to be richer in furfural than the azeotropic composition. Overhead compositions with a steam-furfural mole ratio of 10:1 to about 4:1 may be obtained in this way although the bottom product is an aqueous phase substantially free of furfural. This is unexpected since the prior art teaches that a distilling column cannot separate a binary mixture which forms an azeotrope into an overhead vapor whose composition is on one side of the azeotropic composition while simultaneously delivering a bottom product whose composition is on the other side of the azeotrope regardless of the ratio in which components are fed to the column. As previously noted, steam-furfural mixtures in which the steam-furfural mole ratio is in the range 10:1 to 5:1 fall in a preferred range for use in the catalytic decarbonylation of furfural. For this purpose, mixtures containing high furfural contents are economical in the sense that with their use, the rate of furan production is maximal and the amount of aqueous furan process effluent that must be condensed and rehandled for furfural recovery is at a minimum.

Adjustment of the total furfural feed and steam feed with due allowance for steam condensation so that the ratio of steam to furfural will be less than that of the azeotrope can be readily accomplished by one skilled in the art. This involves calculating the heat balance and estimating condensation of steam by making allowance for the steam temperature, the heat loss of the column, the heat required to raise the liquid feeds to the required column temperatures, etc. For the purposes of this invention the statement that—the total furfural feed and steam feed are adjusted so that with due allowance for steam condensation the mole ratio of steam to furfural will be less than that of the steam-furfural azeotrope—is intended to cover this control feature. It does not explain the unique results of the process of this invention.

Another advantage of the process of this invention is found in the fact that loss of furfural is unexpectedly low and that any insoluble tar is suspended in a moving aqueous phase. The properties of this suspension are such that the tar has little tendency to deposit and plug the column but is efficiently removed in the aqueous bottom product. As a result hold-ups for cleaning the column are reduced to a minimum.

The preferred method of operating the process of this invention and the equipment required is illustrated in greater detail in the accompanying drawing. This apparatus involves a distilling column, 10, which is modified for continuous use in the process. The column itself is a fractionating column of the type well-known in the art. The column as shown containing plates, 6, is most satisfactory but a packed column may also be employed. Sieve plate columns are preferred because they have the least tendency to pick up the tars suspended in the aqueous liquid passing down the column. With such plates, the time between cleaning periods for tar removal which is greatly lengthened by this invention can be still further lengthened so that vaporator cleaning is seldom necessary.

The process is usually carried out by feeding substantially pure liquid furfural to the top plate of the column through line 1. An aqueous phase containing zero to about 5% by weight of dissolved furfural is simultaneously fed to a lower plate in the column not more than halfway down the column but preferably to the second or third plate. For the purpose of this patent, these plates, viz. the second and third plates are designated as a plate only slightly below the top plate. Steam is fed to the bottom part of the column through line 3 just above the liquid level, 5, of the bottom product. The bottom product which is substantially furfural-free but contains high boiling impurities and suspended tars is drawn off from the bottom of the column through line 4. The overhead product leaves the top of the column through line 7. This overhead consists of the gaseous mixture of steam and furfural previously described. This gaseous product is suitable for direct use in the production of furan derivatives.

The process can be carried out below atmospheric or at higher pressure, e.g., in the range 10–165 lb. per sq. in. In general, however, the preferred operating pressure is in the range 10–30 p.s.i.g. (pounds per sq. in. gauge). The composition of the steam-furfural azeotrope is not greatly affected by pressure changes in this range.

Although the apparatus shown in the drawing represents the preferred means for carrying out the process of this invention, it is understood that the invention is not limited to this specific embodiment. Modifications and equivalents will be immediately apparent to those skilled in the art. The specific design and materials of construction are naturally subject to variation.

This process is particularly advantageous for use in conjunction with the previously described catalytic processes for the production of furan by the gas phase decarbonylation of gaseous steam-furfural compositions. The recovery still of this process can be used to produce the steam-furfural composition required while simultaneously recovering unconverted furfural from the dilute aqueous solution obtained as a primary condensate in separating furan from the crude off-gases of the decarbonylation process. In this process combination the dilute furfural solution normally contains from 0.1 to about 5% furfural by weight as previously pointed out. The furfural feed is usually a substantially pure grade of commercial furfural.

The invention is illustrated in still greater detail by the following examples.

*Example 1*

Steam vaporization and recovery of furfural from dilute aqueous solution were carried out simultaneously with equipment as shown in the attached drawing using a steel still column having a height of about 20 feet and a diameter of 6" and containing 20 sieve plates. The equipment was operated at a pressure of 15 p.s.i.g. Furfural was fed onto the top plate of the still at a rate of 112 lbs. per hour. By-product aqueous condensate recovered from furfural decarbonylation containing about 1% furfural was added on the tenth plate at a rate of 143 lbs. per hour and a temperature of 85° C. Steam was fed into the bottom part of the column at 190 lbs. per hour at a temperature of 120° C. The water leaving the still as a bottom product contained no detectable furfural. The overhead product consisted of a gaseous mixture of steam and furfural in the mole ratio 8.1:1 (39.7% furfural by weight) at a temperature of 114° C. Tarry impurities in the furfural tended to slowly plug the upper plates of the column but the operation of the process was otherwise satisfactory.

*Example 2*

Experimental runs similar to Example 1 were now carried out using a 15-sieve-plate column but in these experiments the dilute furfural was added on the second plate from the top of the column. In this case, the upper plates of the column did not tend to collect tar as in Example 1. Feed rates, operating temperatures and results are summarized below for two tests, A and B.

| | Test A | Test B |
|---|---|---|
| Furfural— | | |
| Feed rate, lbs./hr | 82 | 61 |
| Temp. (degrees centigrade) | 37 | 37 |
| Dilute Aq. Furfural— | | |
| Feed rate, lbs./hr | 142 | 110 |
| Temp. (degrees centigrade) | 85 | 81 |
| Steam Feed—lbs./hr | 162 | 124 |
| Column Temperatures (degrees centigrade)— | | |
| Top of Column | 116 | 117 |
| Bottom of Column | 120 | 120 |
| Bottoms—Percent Furfural | 0.01 | 0.35 |
| Overhead Product— | | |
| Mole ratio water-furfural | 8.8:1 | 7.3:1 |
| Percent Furfural by Wt | 37.7 | 42.3 |
| Pressure at Base of Still (p.s.i.g.) | 15.4 | 14.7 |

Although the examples have been limited to processes involving the vaporization of substantially pure furfural and the recovery of furfural from dilute aqueous solution containing around 1% furfural by weight, the invention will also function with furfural containing up to about 12% by weight of dissolved water and water containing up to about 16% by weight of dissolved furfural.

Having described the invention, we claim:

1. In a process for the production of a gaseous steam-furfural composition containing a greater proportion of furfural than that of the steam-furfural azeotrope by steam distillation carried out in a distillation column, the steps comprising:
    (a) feeding furfural into the top of said column,
    (b) feeding an aqueous phase containing not more than 5% by weight furfural slightly below the top of said column,
    (c) removing a substantially furfural-free aqueous bottom product from the bottom of said column,
    (d) feeding steam into the bottom part of said column above the liquid level of said bottom product, and
    (e) removing the gaseous steam-furfural product composition as an overhead product.

2. The process of claim 1 in which the total furfural feed and the steam feed are adjusted so that with due allowance for steam condensation the mole ratio of steam to furfural is less than 10:1.

3. The process of claim 2 in which the operating pressure is in the range 10 to 30 p.s.i.g.

4. A continuous process for the recovery of furfural as a gaseous steam-furfural composition containing a greater proportion of furfural than the steam-furfural azeotrope by the steam distillation of a liquid furfural phase and an aqueous phase containing furfural in a distilling column comprising the steps:
    (a) feeding liquid furfural phase containing not more than about 12% by weight of water into the top of said column,
    (b) feeding aqueous phase containing not more than substantially 16% by weight of furfural into the upper half of said column but below the feeding point of said furfural phase,
    (c) removing substantially furfural-free aqueous bottom product containing suspended tars from the bottom of said column,
    (d) feeding steam into the bottom part of said column above the level of said bottom product, and (e) removing the gaseous steam-furfural product composition from the top of said column.

5. The process of claim 4 in which the total furfural feed and the steam feed are adjusted so that with due allowance for steam condensation, the mole ratio of steam to furfural is less than 10:1.

References Cited in the file of this patent

UNITED STATES PATENTS

| | | |
|---|---|---|
| 2,167,730 | Smoley | Aug. 1, 1939 |
| 2,374,149 | Whitman | Apr. 17, 1945 |
| 2,436,502 | Buell et al. | Feb. 24, 1948 |
| 2,776,981 | Tyran | Jan. 8, 1957 |

OTHER REFERENCES

Curtis et al.: Australia J. Sci. Res., Series A, vol. 1 (1948), pages 213–35, pages 218–22.

Dunlop: The Furans (Reinhold Publ. Corp., 1953), pp. 318–319 and 323.

Coulson et al.: Laboratory Distillation Practice (1958), pages 120–2.